US008765207B2

(12) United States Patent
Coles et al.

(10) Patent No.: US 8,765,207 B2
(45) Date of Patent: Jul. 1, 2014

(54) FRUIT PRODUCT CONTAINING SUGAR ALCOHOL

(76) Inventors: Paul Coles, Castro Valley, CA (US); Karim Nafisi, Walnut Creek, CA (US); Jackie Curtis, Walnut Creek, CA (US); Frances Jin, Concord, CA (US)

( * ) Notice: Subject to any disclaimer, the term of this patent is extended or adjusted under 35 U.S.C. 154(b) by 424 days.

(21) Appl. No.: 11/786,207

(22) Filed: Apr. 10, 2007

(65) Prior Publication Data

US 2008/0254196 A1 Oct. 16, 2008

(51) Int. Cl.
*A23B 7/00* (2006.01)
*A23L 1/09* (2006.01)
*A23L 1/212* (2006.01)
*A23B 7/08* (2006.01)

(52) U.S. Cl.
CPC ............... *A23L 1/2123* (2013.01); *A23L 1/097* (2013.01); *A23V 2002/00* (2013.01); *A23L 1/2128* (2013.01); *A23B 7/085* (2013.01)
USPC ............................. 426/616; 426/324; 426/325

(58) Field of Classification Search
USPC .................................................. 426/616, 639
See application file for complete search history.

(56) References Cited

U.S. PATENT DOCUMENTS

| | | | | |
|---|---|---|---|---|
| 1,611,708 A | * | 12/1926 | Amsden | 248/159 |
| 2,608,489 A | * | 8/1952 | Walker | 426/548 |
| 3,296,079 A | * | 1/1967 | Griffin | 424/49 |
| 4,350,711 A | * | 9/1982 | Kahn et al. | 426/102 |
| 4,879,127 A | * | 11/1989 | Liu et al. | 426/325 |
| 5,106,632 A | | 4/1992 | Wong et al. | |
| 2004/0022901 A1 | | 2/2004 | Funk | |
| 2004/0234648 A1 | | 11/2004 | Mazurek et al. | |
| 2005/0084506 A1 | * | 4/2005 | Tachdjian et al. | 424/400 |
| 2005/0196503 A1 | | 9/2005 | Srivastava | |

FOREIGN PATENT DOCUMENTS

RU 2277351 C1 * 6/2006

OTHER PUBLICATIONS

Calorie Control Council: Sorbitol is from: http://www.caloriecontrol.org/sweeteners-and-lite/polyols/sorbitol; printed Apr. 7, 2010.*
National Digestive Diseases Information Clearinghouse: Gas in the Digestive Track is from: http://digestive.niddk.nih.gov/ddiseases/pubs/gas/; Jan. 2008.*
Recipe Zaar: Peach Pie Recipe 110701; http://www.recipezaar.com/recipe/Peach-Pie-110701; Jul. 18, 2006.*
Love to Know: http://recipes.lovetoknow.com/wiki/Mixed$_{13}$ Fruit_Cocktail_Recipe; Oct. 5, 2006.*
Diana's Deserts: Peach Custard Pie; published May 15, 2006; http://web.archive.org/web/20060515073745/http://www.dianasdesserts.com/index.cfm/fuseaction/recipes.recipeListing/filter/dianas/recipeID/2279/Recipe.cfm.*
D-Sorbitol; published 2004; http://web.archive.org/web/20040815071413/http://www.greatvistachemicals.com/proteins-sugars-nucleotides/d-sorbitol.html.*
http//polyol.org: The Benefits of Polyols; published Jan. 12, 2007; http://web.archive.org/web/20070112154432/http://www.polyol.org/benefits.html.*
Alzamora: Combined Preservation Technologies for Fruits and Vegetables: training Manual; Food and Agriculture Organization of the United Nations Rome, 2003; The Agricultural and Food Engineering Technologies Service; The Agricultural Support Systems Division FAO of the U.N.*
Alzamora: Combined Preservation Technologies for Fruits and Vegetables: training Manual (cont.); Food and Agriculture Organization of the United Nations Rome, 2003; The Agricultural and Food Engineering Technologies Service; The Agricultural Support Systems Division FAO of the U.N.*
Alashkar, Iman; "It Tastes Like Medicine"; 2006, Pharmaceutical Formulation and Quality, pp. 30-37.

* cited by examiner

*Primary Examiner* — Patricia George
(74) *Attorney, Agent, or Firm* — Dilworth Paxson LLP

(57) ABSTRACT

A processed fruit product, for example a citrus fruit product, including a packing liquid, containing little or no sugar, and optionally containing one or more artificial sweeteners, further comprising an amount of a sugar alcohol effective to maintain integrity and/or texture of the fruit.

42 Claims, No Drawings

FRUIT PRODUCT CONTAINING SUGAR ALCOHOL

BACKGROUND OF THE INVENTION

This invention relates to new fruit products, and more particularly to a new shelf stable or refrigerated fruit product having little or no sugar and optionally also containing one or more artificial or non-nutritive sugar sweeteners.

There exist numerable food products that are designated as "sugar-free" or "no sugar added" products in which sweetening, if needed, is provided by artificial sweeteners such as saccharin, aspartame, and sucralose. In general, these are designated for low calorie diets or restricted diets such as those for diabetics. For the most part, replacement of sugar in such products by such artificial sweeteners has been a relatively straightforward matter. However, it was determined by us that replacement of sugar in a fruit product was not at all straightforward. In carrying out work to produce artificially sweetened shelf-stable or refrigerated fruit products, it was found that in some instances such as citrus fruits, segments absorbed water from the packing liquid to such an extent that they began to disintegrate. In other instances, for example, with fruits other than citrus fruits, we found that deterioration of the texture of the fruit occurred. We determined that this is caused by osmosis; i.e., osmotic pressure differences between the packing medium, which has a low solid content, and the fruit, with relatively higher solid content, drive water from the medium into the fruit, causing fruit disintegration.

Accordingly, it is an object of this invention to provide a fruit product, particularly a thermally processed or refrigerated product, and more particularly a citrus fruit product, packed in a packing liquid, having little or no sugar and optionally also containing one or more artificial or non-nutritive sweeteners, in which the structural integrity and/or the texture of the fruit or fruit segments is maintained.

BRIEF SUMMARY OF THE INVENTION

In brief, this invention comprises a thermally processed (shelf-stable) or non-thermally processed fruit (i.e., refrigerated fruit) product, in one embodiment a citrus fruit product, including a packing liquid, containing little or no sugar, and optionally containing one or more artificial or non-nutritive sweeteners, further comprising an amount of a sugar alcohol effective to maintain structural integrity and/or texture of the fruit or fruit segments.

DETAILED DESCRIPTION OF THE INVENTION

As stated above, in brief, this invention comprises a thermally processed or non-thermally processed fruit (i.e., refrigerated fruit) product, in one embodiment a citrus fruit product, including a packing liquid, containing little or no sugar, and optionally containing one or more artificial or non-nutritive sweeteners, further comprising an amount of a sugar alcohol effective to maintain structural integrity and/or texture of the fruit or fruit segments. While we do not intend to be bound thereby, this result is believed to be due to balancing the osmotic pressure between the fruit and the packing liquid medium.

The product may be what is known as a "thermally processed" product, that is, heat has been applied to it in processing and the product is shelf-stable, or it may be a non-thermally processed product that requires refrigeration or freezing. Typically, thermally processed fruit products are those that are canned or in a glass or plastic container or other type of container such as a plastic-lined paper package and that are shelf-stable, i.e. do not require refrigeration.

The fruit contained in the products may be any fruit, such as peaches, pears, pineapple, cherries, grapes, mangos, mixed fruit cocktails, and other fruits, including mixtures of two or more fruits, and may be peeled whole, sliced, diced or cut into pieces. In one preferred embodiment the fruit is a citrus fruit or mixture of citrus fruits. The most common citrus fruit products are oranges, grapefruits, tangerines and mandarins or mandarin oranges. However, the invention may be used for other citrus fruits such as pomelos, tangelos, lemons, Meyer lemons, limes, and the like. The products of this invention also include prepared fruit products such as pie fillings and other processed and preserved fruit.

The fruit, after being prepared, is packed in a packing liquid that primarily comprises water. The water may be tap water or water that has been filtered, distilled and/or deionized. For ordinary canned fruit products and the like, sugar is added to the packing liquid to produce a syrup. In addition to sugar and water, some acids such as citric acid, malic acid, etc. and some ascorbic acid for color protection and vitamin C source, are often added, and these may be included in the products of this invention as well. For "no sugar" or "low sugar" products, an artificial sweetener is used in place of all or most of the sugar. Artificial sweeteners typically used for such fruit products include saccharin, sucralose, aspartame, and acesulfame or its salts.

However, attempts to produce low sugar or no-sugar citrus fruit products using those typical artificial sweeteners resulted in products in which the citrus segments absorbed large amounts of water and fruit cell sacs fell apart, i.e., a very poor quality product resulted.

According to the invention, it has been found that the inclusion of an amount of a sugar alcohol or a combination of sugar alcohols can result in a quality product, i.e. a low-sugar or no-sugar product in which the citrus fruit sections and/or cell sacs remain intact, or the integrity or texture of the fruit is maintained, for other fruits. Such a product will have a packing liquid equivalent in quality to either a light or a high sugar-containing-syrup, depending on the amount of sugar alcohol included.

Sugar alcohols useful in carrying out the invention include those chemical compounds generally understood to be in this class, for example, sorbitol, maltitol, mannitol, xylitol, lactitol, erythritol, glycerol, and other hydrogenated simple or complex carbohydrates usually considered to be included in the term "sugar alcohols". One example of a complex carbohydrate that can be hydrogenated to produce a sugar alcohol suitable for use in this invention is maltodextrin. Sorbitol is generally preferred for use at this time because of its lower cost. Sorbitol and other sugar alcohols are used as sweeteners in certain products, for example, "sugar-free" hard candies and "sugar-free" chewing gums for prevention of tooth decay, but have not heretofore been used in processed fruit products. One reason is that while sugar alcohols are non-nutritive ingredients; that is, they are not absorbed into the body, too high sugar alcohol content could have a laxative affect. In addition, in some cases their usage level is limited by law.

The sugar alcohols may serve as the sole sweetener in the products of this invention; however, in a preferred embodiment one or more sugar alcohols is used in combination with one or more artificial sweeteners such as saccharin, acesulfame, aspartame, sucralose and the like. Nevertheless, especially for "light" fruit products (where a lower sweetness is expected by consumers) one or a combination of sugar alcohols may be used without any of these usual artificial sweeteners. The sugar alcohol is used in an amount effective to allow the fruit sections to retain their structural integrity. The amount effective for this purpose will vary according to the fruit, the sugar alcohol, and the amount of sugar (if any) in the product. In any event, the choice of a particular sugar alcohol, the amount, and the use of an artificial sweetener (and its amount) is carried out with the dual purpose of providing a "low-sugar" or "no-sugar" product of the desired sweetness while retaining the quality of the fruit product, and these choices can be made from the information contained herein.

More particularly, the sugar alcohol is included in the processed fruit products in an amount of from about 1 to about 90 wt. % in the syrup, preferably from about 5 to about 50 wt. %. If an artificial sweetener is used, it will be included in the product in an amount of from about 0.01 to about 2 wt. % in the syrup.

The amount of a given sugar alcohol in the product will depend on the particular sugar alcohol and the amount of sugar, if any, that is included in the product. The appropriate amount of sugar alcohol to be included in a given product is determined by determining the osmotic pressure of sugar in a comparable sweetened product and then adding sufficient sugar alcohol to provide approximately the same osmotic pressure.

The product may contain sugar (in the form, for instance, of sucrose, corn syrup and/or high fructose corn syrup). For example, it may contain up to about 10 wt. % sugar or the like, so as to constitute what is termed a "low sugar" product. Any sugar in the syrup could come from the fruit itself (for example, pineapple sugars contain as high as 20% sucrose in addition to glucose and fructose) or from a sugar that is added to the syrup.

The following are examples of products according to this invention:

Example 1

Canned Mandarin Oranges

A canned mandarin orange product according to the invention and containing sorbitol is prepared by the following steps:
Fruit Preparation
1. The peel is removed.
2. The membrane is removed.
3. Segments are sorted for defects.
4. Selected segments are sorted by size.
5. The fruit is filled into containers; the weight of the fruit is checked.
6. "Syrup" as prepared below is added to the container.
7. The container is sealed and is then thermally processed to a commercially acceptable center of container temperature.
8. The thermally processed container is cooled to ambient temperature.

Syrup Preparation
1. Water is measured into a stainless steel syrup tank in an amount to produce a final syrup containing 79 wt. % water.
2. Sufficient liquid sorbitol is added at 70° brix to produce a syrup containing 20.75 wt. % sorbitol.
3. The syrup is heated to 80 to 220° F., preferably 160° F., and is maintained at that temperature for about 2 to 120 minutes, preferably for 30 minutes at 160° F.
4. Then there are added (in wt % of the final syrup) 0.1% citric acid, 0.15% ascorbic acid, and any artificial sweeteners (for example, acesulfame-K, sucralose, or stevia) at 0.01 to 2.0%, preferably 0.1%.
5. The syrup ingredients are mixed thoroughly. The syrup is transferred to a syrup holding tank and mixed with the filled fruit in step 6 above.

Example #2

No Sugar Added Diced Pear

Fruit Preparation
1. The peel is removed and the fruit is cored
2. The fruit is cut into halves, sliced or diced.
3. The cut fruit is sorted for defects.
4. Selected fruit is sorted for off-shapes.
5. The fruit is filled into containers and the weight of the fruit checked.
6. "Syrup" is added to the containers.
7. The containers are sealed and thermally processed to a commercially acceptable center of container temperature.
8. The thermally processed containers are cooled to ambient temperature.

Syrup Preparation
1. Water is measured into a stainless steel syrup tank in an amount to produce a final syrup containing about 71 wt. % water.
2. Sufficient liquid sorbitol is added at 70° brix to produce a syrup containing 28.75 wt. % sorbitol.
3. The syrup is heated to 80 to 220° F., preferably 160° F., and is maintained at that temperature for about 2 to 120 minutes, preferably for 30 minutes at 160° F.
4. Then there are added (in wt % of the final syrup) 0.1% citric acid, 0.15% ascorbic acid, and any artificial sweeteners (for example, acesulfame-K, sucralose, or stevia) at 0.01 to 2.0 wt. %, preferably 0.1%.
5. The syrup ingredients are mixed thoroughly. The syrup is transferred to a syrup holding tank and mixed with the filled fruit in step 6 above.

Example #3

No Sugar Added Diced Peaches

Fruit Preparation
1. The peach pits are removed.
2. Peaches are halved.
3. If necessary, the halves are peeled by any conventional method.
4. The halves are diced.
5. The fruit is filled into containers and the weight of the fruit checked.
6. "Syrup" as prepared below is added to the fruit.

Syrup Preparation
Similarly to example 2, a canned peach product is prepared with the syrup containing about 78 wt. % water and 21.75 wt. % xylitol and optionally an artificial sweetener at 0.01 to 2.0%, preferably at 0.1%.

Example #4

No Sugar Added Peach Pie Filling

A thermally processed peach pie filling according to the invention is prepared as follows:
Fruit Preparation
1. The pit is removed and the fruit is peeled.
2. The fruit is sliced or diced.
3. The cut fruit is sorted for defects.

4. Selected fruit is sorted for off-shapes, if necessary.
5. The fruit is filled into containers and the weight of the fruit checked.
6. A peach pie filling sauce prepared as described below is added to the containers.
7. The containers are sealed and thermally processed to a commercially acceptable center of container temperature.
8. The thermally processed containers are cooled to ambient temperature.

B. Sauce Preparation
1. A dry blend of xanthan gum, maltitol and starch is prepared.
2. The dry blend is added to water in an amount so as to produce a final sauce containing 22.75 wt. % maltitol and 0.2 to 2.0 wt. % xanthan gum, preferably 0.5 wt. %.
3. Flavoring agents and other additives are added to the mixture: cinnamon, nutmeg, sodium citrate, citric acid, ascorbic acid and any artificial sweeteners (for example, acesulfame-K, sucralose, or stevia) at 0.01 to 2.0 wt. %, preferably 0.1 wt. %.
4. The resulting mixture is mixed until blended, then added to the fruit product as described above.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. A method for minimizing disintegration and/or deterioration of one or more whole fruits and/or segments thereof in a processed, packaged fruit product comprising:
   (1) providing said one or more whole fruits or segments thereof;
   (2) providing a packing liquid comprising:
      one or more sugar alcohols, wherein said one or more sugar alcohols are present in an amount sufficient to minimize osmosis between said packing liquid and said one or more whole fruits and/or segments thereof; and
   (3) packing said one or more whole fruits or segments thereof with said packing liquid in said packaged fruit product thereby minimizing osmosis in said packaged fruit product and maintaining structural integrity and/or texture of said one or more whole fruits and/or segments thereof;
in a manner that no external sugar is added in steps (1), (2), or (3).

2. The method according to claim 1 comprising thermally processing said processed, packaged fruit product to a commercially-acceptable center of container temperature.

3. The method according to claim 1 wherein said processed, packaged fruit product is not thermally processed.

4. The method according to claim 1 wherein said one or more sugar alcohols are selected from sorbitol, maltitol, mannitol, xylitol, lacitol, erythritol, and glycerol.

5. The method according to claim 1 comprising from about 1 wt % to about 90 wt % of said one or more sugar alcohols in said packing liquid.

6. The method according to claim 1 comprising from about 1 wt % to about 30 wt % of said one or more sugar alcohols in said packing liquid.

7. The method according to claim 1 comprising from about 5 wt % to about 50 wt % of said one or more sugar alcohols in said packing liquid.

8. The method according to claim 1 comprising from about 5 wt % to about 30 wt % of said one or more sugar alcohols in said packing liquid.

9. The method according to claim 1 comprising from about 20 wt % to about 30 wt % of said one or more sugar alcohols in said packing liquid.

10. The method according to claim 1 wherein said one or more whole fruits or segments thereof comprise citrus fruit, non-citrus fruit, or a combination of citrus fruit and non-citrus fruit.

11. The method according to claim 10 wherein said citrus fruit comprises one or more citrus fruit selected from orange, grapefruit, kumquat, pomelo, tangelo, citrange, citron, lemon, lime, mandarin orange, and tangerine.

12. The method according to claim 10 wherein said non-citrus fruit comprises one or more non-citrus fruit selected from peaches, pears, pineapple, cherries, mangos, and grapes.

13. The method according to claim 1 comprising from about 0.01 wt % to about 2 wt % of one or more non-nutritive sweeteners in said packing liquid.

14. The method according to claim 1 comprising one or more non-nutritive sweeteners selected from aspartame, sucralose, and acesulfame and/or acesulfame salts.

15. A method for preserving one or more whole fruits and/or segments thereof in a processed, packaged fruit product comprising:
   (1) providing said one or more whole fruits or segments thereof;
   (2) providing a packing liquid comprising:
      one or more sugar alcohols, wherein said one or more sugar alcohols are present in said packing liquid in an amount sufficient to minimizes osmosis between said packing liquid and said one or more whole fruits and/or segments thereof; and
   (3) packing said one or more whole fruits or segments thereof with said packing liquid in said packaged fruit product, thereby balancing osmotic pressure between said packing liquid and said one or more whole fruits and/or segments thereof and maintaining structural integrity and/or texture of said one or more whole fruits and/or segments thereof;
in a manner that no external sugar is added in steps (1), (2), or (3).

16. The method according to claim 15 comprising thermally processing said processed, packaged fruit product to a commercially-acceptable center of container temperature.

17. The method according to claim 15 wherein said processed, packaged fruit product is not thermally processed.

18. The method according to claim 15 wherein said one or more sugar alcohols are selected from sorbitol, maltitol, mannitol, xylitol, lacitol, erythritol, and glycerol.

19. The method according to claim 15 comprising from about 1 wt % to about 90 wt % of said one or more sugar alcohols in said packing liquid.

20. The method according to claim 15 comprising from about 1 wt % to about 30 wt % of said one or more sugar alcohols in said packing liquid.

21. The method according to claim 15 comprising from about 5 wt % to about 50 wt % of said one or more sugar alcohols in said packing liquid.

22. The method according to claim 15 comprising from about 5 wt % to about 30 wt % of said one or more sugar alcohols in said packing liquid.

23. The method according to claim 15 comprising from about 20 wt % to about 30 wt % of said one or more sugar alcohols in said packing liquid.

24. The method according to claim 15 wherein said one or more whole fruits or segments thereof comprise citrus fruit, non-citrus fruit, or a combination of citrus fruit and non-citrus fruit.

25. The method according to claim 24 wherein said citrus fruit comprises one or more citrus fruit selected from orange, grapefruit, kumquat, pomelo, tangelo, citrange, citron, lemon, lime, mandarin orange, and tangerine.

26. The method according to claim 24 wherein said non-citrus fruit comprises one or more non-citrus fruit selected from peaches, pears, pineapple, cherries, mangos, and grapes.

27. The method according to claim 15 comprising from about 0.01 wt % to about 2 wt % of one or more non-nutritive sweeteners in said packing liquid.

28. The method according to claim 15 comprising one or more non-nutritive sweeteners selected from aspartame, sucralose, and acesulfame and/or acesulfame salts.

29. A method for retaining structural integrity and/or texture of one or more whole fruits and/or segments thereof in a processed, packaged fruit product comprising:
(1) providing said one or more whole fruits and/or segments thereof, and
(2) packing said one or more whole fruits and/or segments thereof in a packing liquid, said packing liquid comprising:
one or more sugar alcohols and no sugar, wherein said one or more sugar alcohols are present in said packing liquid in an amount sufficient to minimize osmosis between said packing liquid and said one or more whole fruits and/or segments thereof, thereby providing conditions for balancing osmotic pressure between said packing liquid and said one of more whole fruits or segments thereof
in a manner that no external sugar is added in steps (1) or (2).

30. The method according to claim 29 comprising thermally processing said processed, packaged fruit product to a commercially-acceptable center of container temperature.

31. The method according to claim 29 wherein said processed, packaged fruit product is not thermally processed.

32. The method according to claim 29 wherein said one or more sugar alcohols are selected from sorbitol, maltitol, mannitol, xylitol, lacitol, erythritol, and glycerol.

33. The method according to claim 29 comprising from about 1 wt % to about 90 wt % of said one or more sugar alcohols in said packing liquid.

34. The method according to claim 29 comprising from about 1 wt % to about 30 wt % of said one or more sugar alcohols in said packing liquid.

35. The method according to claim 29 comprising from about 5 wt % to about 50 wt % of said one or more sugar alcohols in said packing liquid.

36. The method according to claim 29 comprising from about 5 wt % to about 30 wt % of said one or more sugar alcohols in said packing liquid.

37. The method according to claim 29 comprising from about 20 wt % to about 30 wt % of said one or more sugar alcohols in said packing liquid.

38. The method according to claim 29 wherein said one or more whole fruits or segments thereof comprise citrus fruit, non-citrus fruit, or a combination of citrus fruit and non-citrus fruit.

39. The method according to claim 38 wherein said citrus fruit comprises one or more citrus fruit selected from orange, grapefruit, kumquat, pomelo, tangelo, citrange, citron, lemon, lime, mandarin orange, and tangerine.

40. The method according to claim 38 wherein said non-citrus fruit comprises one or more non-citrus fruit selected from peaches, pears, pineapple, cherries, mangos, and grapes.

41. The method according to claim 29 comprising from about 0.01 wt % to about 2 wt % of one or more non-nutritive sweeteners in said packing liquid.

42. The method according to claim 29 comprising one or more non-nutritive sweeteners selected from aspartame, sucralose, and acesulfame and/or acesulfame salts.

* * * * *